(12) United States Patent
Slama et al.

(10) Patent No.: US 12,134,352 B2
(45) Date of Patent: Nov. 5, 2024

(54) HYBRID INTERIOR MIRROR WITH ERROR RECOGNITION

(71) Applicant: MOTHERSON INNOVATIONS COMPANY LIMITED, London (GB)

(72) Inventors: Alexander Slama, Stuttgart (DE); Ilka Rötzer, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 573 days.

(21) Appl. No.: 17/491,728

(22) Filed: Oct. 1, 2021

(65) Prior Publication Data

US 2022/0017016 A1    Jan. 20, 2022

Related U.S. Application Data

(63) Continuation-in-part of application No. 16/664,094, filed on Oct. 25, 2019, now Pat. No. 11,312,304.

(30) Foreign Application Priority Data

Oct. 26, 2018 (DE) .................. 10 2018 126 829.7

(51) Int. Cl.
| | |
|---|---|
| B60R 1/12 | (2006.01) |
| B60R 1/04 | (2006.01) |
| B60R 11/02 | (2006.01) |
| B60R 11/04 | (2006.01) |
| B60R 11/00 | (2006.01) |

(52) U.S. Cl.
CPC .................. B60R 1/12 (2013.01); B60R 1/04 (2013.01); B60R 11/0235 (2013.01); B60R 11/04 (2013.01); B60R 2001/1215 (2013.01); B60R 2001/1253 (2013.01); B60R 2011/0033 (2013.01); B60R 2011/0085 (2013.01); B60R 2300/8026 (2013.01); B60R 2300/8066 (2013.01)

(58) Field of Classification Search
CPC ..... B60R 1/12; B60R 1/08; B60R 2001/1215; B60R 2001/1253; B60R 2300/8026; B60R 11/0235; B60R 2011/0033; B60R 2011/0085; B60R 1/04; H04N 7/183
USPC ........................................................ 359/865
See application file for complete search history.

(56) References Cited

U.S. PATENT DOCUMENTS

| | | | |
|---|---|---|---|
| 9,499,110 B2 * | 11/2016 | Takahashi | ............... B60K 35/10 |
| 2007/0132567 A1 * | 6/2007 | Schofield | ............. B60Q 1/2665 |
| | | | 340/438 |
| 2017/0355312 A1 * | 12/2017 | Habibi | .................. B60R 1/088 |
| 2018/0244204 A1 * | 8/2018 | Boehm | ..................... B60R 1/12 |

* cited by examiner

*Primary Examiner* — Tuyen Tra
*Assistant Examiner* — Rahman Abdur
(74) *Attorney, Agent, or Firm* — Jones Day

(57) ABSTRACT

An interior rear view mirror assembly for a vehicle includes a mirror housing rotatably attached to a housing holder which is adapted to be attached to an interior of the vehicle, the mirror housing including a first rear view side to which a reflective mirror element is attached, and a second rear view side to which a display device with a display screen is attached to, where a camera is connected to the display device establishing a display system to provide an image to the display screen; and an actuator unit configured to automatically rotate the mirror housing to the first or second rear view side. A vehicle and a method may be used to operate the interior rear view mirror assembly.

24 Claims, 5 Drawing Sheets

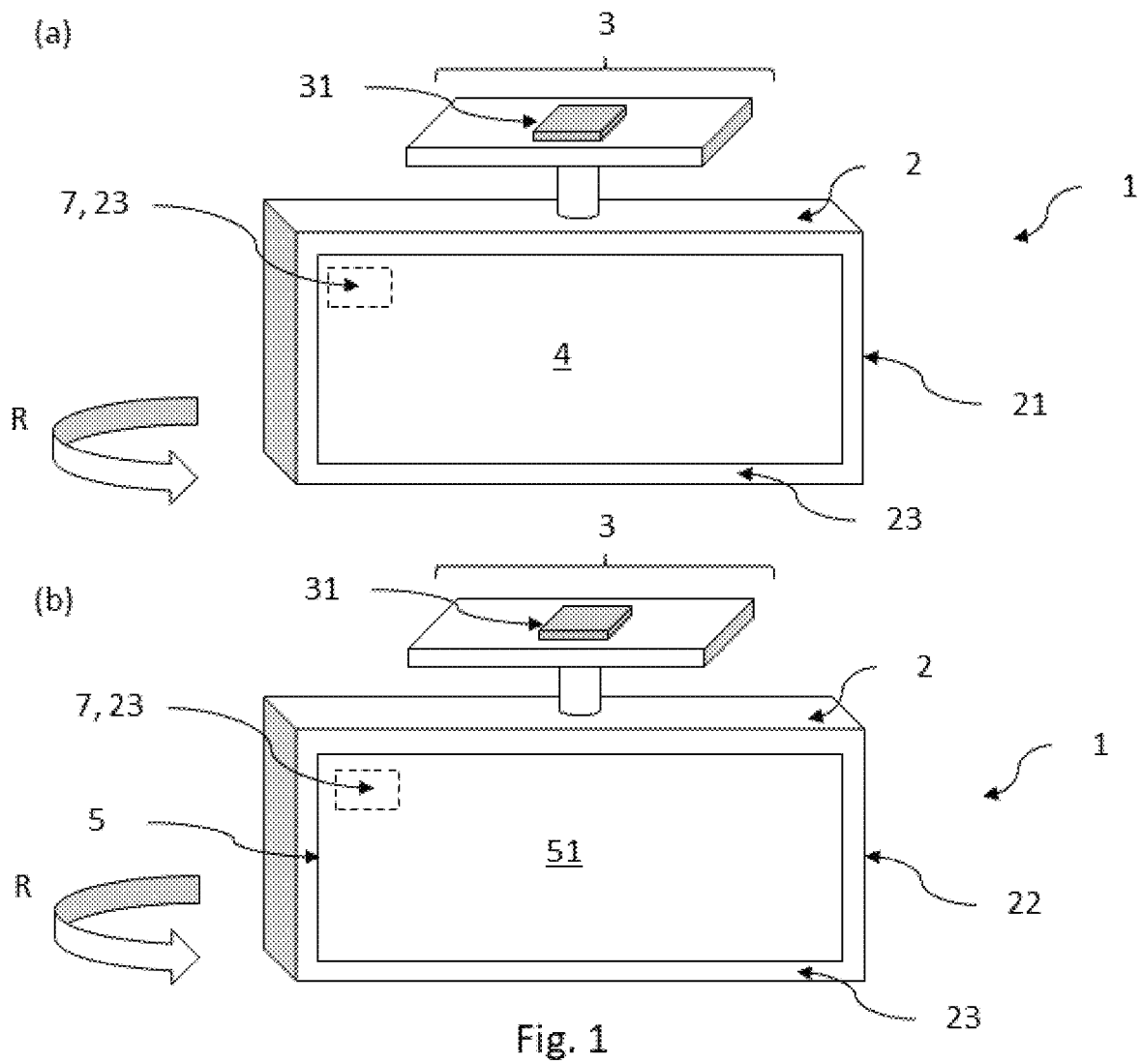
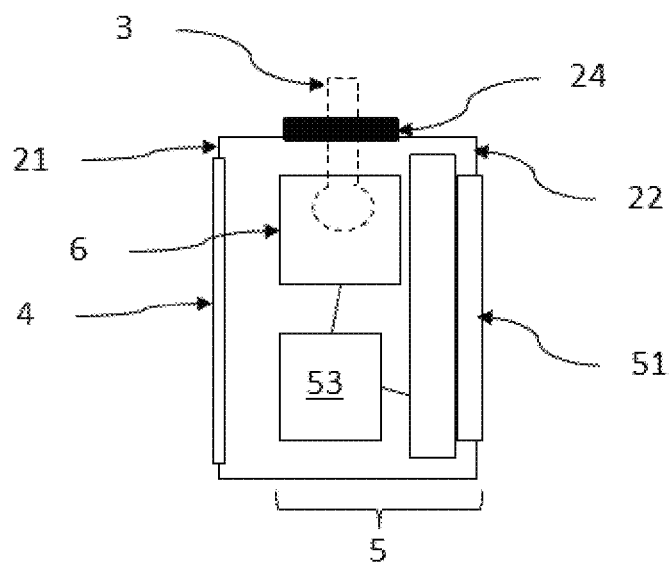
Fig. 2

HYBRID INTERIOR MIRROR WITH ERROR RECOGNITION

CROSS-REFERENCE TO RELATED APPLICATION

This application is a continuation-in-part of U.S. patent application Ser. No. 16/664,094 filed on Oct. 25, 2019, which claims the benefit of foreign priority to German Patent Application No. DE 10 2018 126 829.7, filed Oct. 26, 2018, which is hereby incorporated by reference in its entirety for all purposes.

BACKGROUND

1. Field of the Invention

The present disclosure relates to an interior rear view mirror assembly as a hybrid rear view mirror system which minimizes the driver's distraction when adjusting the mirror and which increases the reliability of presenting rear traffic to the driver for both modes of the hybrid rear view mirror assembly. In addition, the present disclosure describes an interior rearview mirror assembly, a vehicle including such an interior rear view mirror assembly and a method for operating such an interior rear view mirror assembly in the vehicle.

2. Related Art

In motor vehicles, interior mirrors are present to enable the driver to observe the traffic scenery behind the vehicle from its non-changed driver position. Such mirror assemblies are commonly adjustably mounted where the mirror housing can be pivoted around a pivotal fixation, e.g. a ball pivot joint. Interior mirror might by equipped with displays, where the traffic scenery behind the vehicle is recorded by a camera suitably arranged at the vehicle and displayed on the display of the interior mirror. Hybrid mirrors are also known, where a display is covered by a semi-reflective element, where the resulting interior mirror can be operated in a reflective mode with a switch-off display and in a display mode, where the displayed image is displayed through the semi-reflective element. However, due to the semi-reflective element, the reflective mode cannot provide an optimized view with high contrast. On the other hand, the display mode is darkened by the semi-reflective element on top of the display area and will also not provide an optimized view.

US 2017/0355312 A1 describes an interior rearview mirror assembly for a vehicle including a mirror-display assembly adapted to pivotally attach at an interior surface of the vehicle. The mirror-display assembly includes a mirror reflective element and a display device that has a display screen. The mirror reflective element is disposed at a mirror side of the mirror-display assembly and the display screen is disposed at a display side of the mirror-display assembly. The mirror-display assembly is pivotable between a mirror position and a display position. When the mirror-display assembly is in the mirror position, a driver of the vehicle views the mirror reflective element and does not view the display screen, and when the mirror-display assembly is in the display position, the driver of the vehicle views the display screen and does not view the mirror reflective element. The mirror-display assembly pivots about a pivot axis between the mirror position and the display position.

The described hybrid interior rear view mirror can be rotated manually or via a motor in response to a driver input. In the event of manual rotation of the interior mirror by the driver, the driver's attention is distracted from driving events when rotating the mirror to its intended position. In case of a motor driven rotation, the driver again has to give a corresponding input to the mirror controller to rotate the mirror to its intended position. In case of a selected display position the driver has to rely on the correct function of the display—camera system when displaying the recorded traffic scenery behind the vehicle.

US 2018/0244204 A1 describes a detection system for a blocked imager including a rear view with an actuator. The actuator is adjustable to tilt an electro-optical element, whereby the electro-optical element is moved into an off-axis position that changes an activation state of a display module. The actuator is also adjustable to tilt the electro-optical element in a different direction, whereby the electro-optical element is moved to a position on the axis that changes the activation state of the display module. An imager is configured to capture image data from a scene outside the controlled vehicle and generate image data for display on the display module. When a controller determines that the operation capability of the imager to capture image data is at least partially reduced, the controller may generate a control signal indicating that the performance of the imager has been compromised and deactivate the display module.

US 2017/0355312 A1 describes an interior rearview mirror assembly for a vehicle including a mirror display assembly adapted to be pivotally attached at an interior surface of the vehicle. The mirror display assembly includes a mirror reflective element and a display device having a display screen. The mirror reflective element is disposed at a mirror side of the mirror display assembly and the display screen is disposed at a display side of the mirror display assembly. The mirror display is pivotable between a mirror position and a display position. When the mirror display assembly is in the mirror position, a driver of the vehicle views the mirror reflective element and does not view the display screen, and when the mirror display assembly is in the display position, the driver of the vehicle views the display and does not view the mirror reflective element. The mirror display assembly pivots about a pivot axis between the mirror position and the display position.

U.S. Pat. No. 7,370,983 B2 describes an interior rearview mirror arrangement including a display screen which can be extended and retracted relative to a casing. The display screen is movably mounted at the casing and movable or slidable in a direction generally parallel to a length axis of the reflective element between a non-use position, where the video display screen is positioned substantially within the casing and a use position, where the video display screen extending substantially from one side of the housing for viewing. The display screen may be automatically extended in response to an activating event.

DE 10 2012 208 212 A1 describes an assembly including a reconfigurable enclosure fixed to a reflective surface. An actuator is drive coupled to the housing so that an active material element, i.e. a wire, of the actuator undergoes a reversible change in its basic property when exposed to or obscured by an activation signal, for example, a pneumatic activation signal from a controller to enable manipulation of the housing to cause the reflective surface to reach a particular position or angle of reflection. The actuator includes a spring and a locking device that is releasably engaged with the spring. The element is formed of an active material selected from the group consisting of shape memory alloys, ferromagnetic shape memory alloys, magnetorheological fluids, magnetorheological elastomers, electrorheological fluids, electrorheological elastomers, electroactive polymers, piezoelectric materials and composites including above active materials with inactive components material or combination. The activation signal is a thermal activation signal, a magnetic activation signal, an electrical activation signal, a mechanical activation signal, a pneumatic activation signal or a combination.

SUMMARY

In an aspect, an interior rear view mirror assembly for a vehicle includes a mirror housing rotatably attached to a housing holder which is adapted to be attached to an interior of the vehicle, the mirror housing includes a first rear view side to which a reflective mirror element is attached, and a second rear view side to which a display device with a display screen is attached to, where a camera is connected to the display device establishing a display system to provide an image to the display screen, and an actuator unit configured to automatically rotate the mirror housing to the first or second rear view side, the actuator unit is adapted to rotate the mirror housing from the second rear view side to the first rear view side to be visible to the driver in response to an error signal of a malfunction of the display system being detected, the display system further includes a function controller adapted to prove a correct function of the display system to ensure that rear traffic is displayed correctly on the display screen and to send-out the error signal in case of the detected malfunction, the mirror housing includes an indication area illuminated by a lighting unit to indicate a manual mode, an actuator driven mode, or a blocked mode for rotating the mirror housing via different colors so that the indication area indicates to the driver which mode can be used to rotate the mirror housing, and the first and second rearview sides are arranged opposite to each other to provide a view of traffic either via the reflective mirror element or via the display screen.

The interior rear view mirror assembly might be rotated manually or electrically via the actuator from the first rear view side to the second rear view side and vice versa in case of the display system working correctly. The term "rotating" denotes any movement to invert the visible side of the mirror housing of the interior rear view mirror assembly from one side to the other side. The "rotation" might by a movement around one axis, a simple rotation, but might also denoted movements along two or more axes however resulting in an inverted position of the mirror housing. The suspension of the mirror housing to carry out the rotation can be designed differently and include one or more suspension points for the rotation. The display mode to provide rear traffic information to the driver is beneficial, because the displayed information can cover a wider viewing angle than possible with conventional reflective elements. The interior rear view mirror assembly might be connected to a switching or controlling unit, where the driver may initiate automatic rotation of the mirror housing on demand. The interior rear view mirror assembly may increase the driving security for so-called hybrid rear view mirror systems including both, a conventional reflective mirror element and a display screen, because the display function is checked during driving the vehicle preventing a security relevant lack of rear traffic information for the driver based on non-correct images of the rear traffic provided by the display screen. The reflective mirror element ensures that the driver will receive rear traffic information via conventional reflection, which is automatically activated by rotating the mirror housing to the first rear view side, where the reflective mirror element is visible to the driver. An incorrect working or non-working display system cannot provide correct information about the rear traffic to the driver. In this case the display screen is rotated to the side of the mirror housing where the display screen is not visible to the driver but the reflective element now visible reliably shows correct information about the rear traffic in conventional reflective mode. The error signal is provided to the actuator unit by a suitable data connection, e.g. a wire-based or a wireless connection. The content of the error-signal may include a command to rotate the mirror housing to the first rear view side or may include additional data about the error type and further hints to the driver. The term "rear traffic" denotes the occurring traffic behind the vehicle comprising movements of cars, pedestrians, trains, motor cycles, bicycle or other moving or static objects being visible via the rear view mirror assembly via the reflective element or via the display screen based on the recorded camera images.

The reflective mirror element can be any reflective mirror element suitable to provide an image of the rear view traffic. The display screen can be any suitable display screen having a display size fitting into the common dimensions of the mirror housing of rear view mirror assemblies. The display system might be part of the interior rear view mirror assembly comprising the camera or might by established by the display screen of the rear view mirror assembly connected to external components such as the camera. The camera might by arranged at any suitable position at the rear view mirror assembly or at the vehicle to record the rear view traffic and provide corresponding images to the display device. The camera might be any suitable camera for recording images of the rear traffic.

The housing holder might be any suitable holder to fix the rear view mirror assembly to the interior of the vehicle. The fixation might be adapted to be able to rotate the mirror holder manually of automatically via a corresponding holder actuator. The actuator to rotate the mirror housing might be arranged at any suitable position, preferably the actuator is arranged in the housing holder. The type of the actuator might be any suitable actuator or motor. The display device, the actuator or any other electrical component of the interior rear view mirror assembly are connected to a power source of the vehicle via the housing holder and the mirror housing comprising appropriate electrical and/or mechanical connections and/or feed-through.

The rear view mirror assembly may provide a hybrid rear view mirror system, which minimizes the driver's distraction when adjusting the mirror and which increases the reliability of presenting rear traffic to the driver for both modes of the hybrid rear view mirror assembly.

In an embodiment the actuator unit is adapted to execute the rotation from the second rear view side to the first rear view side in a time range below 1 sec after the malfunction is detected. Such a fast rotation ensures that the malfunction of the display system does not cause remarkable security risks when driving the vehicle due to lacking visibility of the present rear traffic.

In another embodiment the actuator unit may include a shape memory alloy in order to rotate the mirror housing. Shape memory alloys (SMAs) can be switched very fast. A rotating mechanism actuated by a shape memory alloy guarantees a fast rotation with a rotation time below one second.

In another embodiment the actuator unit may include a preloaded mechanism in order to perform a rapid rotation of the mirror housing in case of detecting the malfunction. A preloaded mechanism is able to apply a force required to execute the rotation of the mirror housing immediately after releasing the preloaded mechanism resulting in an even faster rotation of the mirror housing. Furthermore a mechanical preload enables to rotated the mirror housing even in case of lacking electrical power, since the required energy to rotate the mirror housing is provided by the preloaded mechanism already having stored the required energy.

The display system may further include a function controller adapted to prove the correct function of the display system to ensure that rear traffic is displayed correctly on the display screen and to send-out the error signal in case of the detected malfunction. The function controller is able to perform different measurements and tests to check the correctness of the image of the rear traffic provided by the display screen in order to prove a suitable number of origins of malfunctions. Preferably the function controller proofs all possible origins of malfunctions. The function controller may include a processor unit where corresponding test algorithms are executed and parameters are determined. The error-signal may include just the command to rotate the mirror housing or additional data to be provided to the driver via suitable means. The function controller is connected to the display system and the actuator via data connections, which might be wired or wireless data connections.

In another embodiment the function controller is adapted to prove the correct function of the display system periodically or continuously. In case of proving the correctness of the functionality of the display system periodically, a period of less than 1 second should be applied. A continuous prove will even more increase the driving security.

In another embodiment the function controller is adapted to check whether recording of the rear traffic is prevented or hampered by a contamination of the camera exceeding a predetermined threshold. A slight contamination might be still acceptable without loss of information about the rear traffic. However, if the camera, for example the lens of the camera, is dirty, wet or covered with too many raindrops etc., the camera will not be able to perform its function and the display screen will no longer be able to correctly show the rear traffic situation. In this case, there is a malfunction of the display system, which leads to the specified reaction.

In another embodiment the function controller is adapted to check whether electrical errors within the display system comprising at least one or more errors of the group of so-called Ghost-Scenarios, flickering, present of a frozen image, image distortion, image pixel failures, provided power is weak or unsecure, exceeds a predetermined threshold. These error sources can be detected by image recognition or other parameter measurements. In case of the errors exceeding the threshold, a malfunction of the display system is recognized, which leads to the specified reaction. Different threshold values might be assigned to different errors sources, since different errors sources might have different impact to the provided rear traffic information. The function controller can run a diagnosis that diagnoses safety-critical errors such as delayed image transmission, whereby for safety reasons no delays of more than 200 ms from image acquisition to image acquisition may occur according to ISO16505. This means that significantly delayed image rate settings of more than 200 ms can be detected. The driver can then be informed accordingly by text or symbol instructions that the mirror housing is now turned automatically. Frozen images are also safety-critical. Even corrupt images such as an upside-down image or an inverted or mirrored image are critical and can be diagnosed.

In another embodiment the function controller is adapted to disable the rotation of the mirror housing after having executed the rotation to the first rear view side as long as the malfunction is present. This safety measure prevents the mirror housing from accidentally rotating back into the display position.

The mirror housing may include an indication area illuminated by a lighting unit to indicate a manual mode, a actuator driven mode or a blocked mode for rotating the mirror housing via different colors. The area indicates to the driver, which mode can be used to rotate the mirror housing, e.g. by lighting the indication area in different colors depending on the indicated mode. Especially the color for blocked mode visualizes the presence of malfunction of the display system to the driver. Preferably, the indication area is shaped as a frame arranged at least partly around the display screen and/or the reflective mirror element to enhance the noticeability of the indication area. The lighting unit may include differently colored LEDs to indicate the different modes.

The interior rear view mirror assembly may include at least one signal unit to send-out warning signals or traffic relevant hints to the driver. The signal unit might be arranged at any suitable position on the interior rear view mirror assembly. The signal unit might be arranged in or on the housing holder or in or on the mirror housing beside or behind the reflective element or beside the display screen or as part of the display screen, e.g. as overlaid information. In case arranging the signal unit behind the reflective element, at least the part of the reflective element in front of the signal unit is semitransparent to make the signal unit visible to the driver. The signal unit might be arranged outside the indication area. In other embodiments the signal unit is part of the indication area.

In another embodiment the signal unit is adapted to indicate at least one of the following elements blind spot warning, temperature, battery status, traffic jam warning, navigation information, multimedia displays, fatigue detection, inspection instructions, weather information, absent calls, incoming calls, calendar appointments, social media information and/or autonomous driving instructions.

In another example, the mirror housing may include a latching mechanism to latch the selected rear view side in the correct position. This quickly achieves the intended correct position of the mirror housing, so that the driver is distracted only minimally in his attention, which is especially important when manually adjusting the mirror housing. The latching mechanism might be provided via a pin or a magnetic stop.

In another embodiment the housing holder is adapted to enable a rotation of the housing holder relative to the interior of the vehicle either manually of automatically via a corresponding holder actuator. With an adaptable housing holder allowing to change its position and correspondingly the position and alignment of the mirror housing, the interior rear view mirror assembly can be adapted to different driver positions, e.g. for different drivers.

In another aspect, a vehicle includes an interior rear view mirror assembly where the interior rear view mirror assembly is attached to an interior of the vehicle at a suitable position to provide a view of a rear traffic to the driver further includes a display system including a camera connected to the display device of the interior rear view mirror assembly to provide an image of the rear traffic to the display screen of the display device.

The vehicle may use the interior rear view mirror assembly according to minimize the driver's distraction when adjusting the mirror and to increase the reliability of presenting rear traffic to the driver for both modes of the hybrid rear view mirror assembly.

In another aspect, a method to operate an interior rear view mirror assembly in a vehicle where the interior rear view mirror assembly is attached to an interior of the vehicle at a suitable position to provide a view of a rear traffic to the driver comprising a mirror housing rotatable attached to housing holder having a first rear view side and a second rear view side being oppositely arranged to the first rear view side, includes: providing a view of a rear traffic to the driver either via a reflective mirror element attached to the first rear view side or via the display screen of a display device, where the display screen is attached to the second rear view side and where a camera is connected to the display device establishing a display system to provide an image of the rear traffic to the display screen; rotating the mirror housing from the first rear view side to the second rear view side or vice versa on demand of the driver in case of correct function of the display system either manually or via an actuator unit to automatically rotate the mirror housing; and rotating the mirror housing by the actuator unit automatically from the second rear view side to the first rear view side to be visible to the driver in response to an error signal in case of detecting a malfunction of the display system.

The method to operate an interior rear view mirror assembly in a vehicle may minimize the driver's distraction when adjusting the mirror and increase the reliability of presenting rear traffic to the driver for both modes of the hybrid rear view mirror assembly.

In another example, the method includes the further steps of proving a correct function of the display system by a function controller of the display system ensuring that the rear traffic is displayed correctly on the display device, and sending-out the error signal in case of the detected malfunction by the function controller.

In another example, the method includes the further step of disabling the rotation of the mirror housing after having executed the rotation to the first rear view side as long as the malfunction is present by the function controller.

In another example, the method includes the further step of indicating a manual mode, an actuator driven mode or a blocked mode for rotating the mirror housing via different colors by an indication area of the mirror housing being illuminated by a lighting unit, preferably arranged at least partly around the display screen or the reflective mirror element.

In an aspect, a rear view mirror assembly for a vehicle that comprises a mirror housing that is attached to a housing holder which is adapted to be attached to the vehicle, the mirror housing comprises at least one reflective mirror element; and at least one display screen of a display system, where at least one camera is comprised of the display system to provide an image to the display screen; where the rear view mirror assembly also comprises a switching unit configured to automatically switch between a first rear view presented to a driver of the vehicle on the display screen to a second rear view presented to the driver of the vehicle on the reflective mirror element, where the switching unit is adapted to switch from the first to the second rear view to be visible to the driver in response to an error signal of a malfunction of the display system being detected, where the display system further comprises a function controller adapted to prove a correct function of the display system to ensure that rear traffic is displayed correctly on the display screen and to send-out the error signal in case of the detected malfunction, where the mirror housing comprises an indication area illuminated by a lighting unit to indicate a manual mode, a switching unit mode, or a blocked mode for switching from the second rear view to the first rear view via different colors so that the indication area indicates to the driver which mode can be used to switch between the second and first rear views.

In an embodiment the rear view mirror assembly is an exterior rear view assembly.

In an embodiment, the reflective mirror element of the rear view mirror assembly is arranged in front or behind the display screen, on the same side of the mirror housing.

In an example, the rear view mirror assembly is an interior rear view assembly, in an embodiment the mirror housing further comprises a latching mechanism to latch a selected rear view side in a correct position, and in even further embodiments, the housing holder is adapted to enable a rotation of the housing holder relative to the interior of the vehicle either manually or automatically via a corresponding holder actuator.

In another example, the first and second rear view sides are arranged opposite to each other to provide a view of traffic either via the reflective mirror element or via the display screen, with a first rear view side of the housing supporting the reflective mirror element and a second rear view side of the housing supporting the display screen in the interior rear view mirror assembly.

In an even further example, the rear view mirror assembly comprises an actuator unit which is adapted to automatically rotate the mirror housing from the second rear view side to the first rear view in response to an error signal of a malfunction of the display system being detected, and in embodiments, the actuator unit may be adapted to execute the rotation from the second rear view side to the first rear view side in a time range below one second after the malfunction is detected, and even further, the function controller can be adapted to disable the rotation of the mirror housing after having executed the rotation to the first rear view side as long as the malfunction is present.

In another example, the indication area of the rearview mirror assembly illuminated by the lighting unit also indicates an actuator driven mode, via a different color so that the indication area indicates to the driver which mode can be used to switch and/or rotate between the second and first rear view.

In an example, the switching unit of the rear view mirror assembly is adapted to execute the switching from the second rear view to the first rear view in a time range below one second after the malfunction is detected.

In an example, the function controller of the rear view mirror is adapted to prove the correct function of the display system periodically or continuously, and in another example the function controller of the rear view mirror assembly is adapted to check whether recording of rear traffic is prevented or hampered by a contamination of the camera exceeding a predetermined threshold. In other examples the function controller is adapted to check whether electrical errors within the display system that comprise at least one or more errors of the group of so-called ghost-scenarios, flickering, presence of a frozen image, image distortion, image pixel failures, provided power is weak or unsecure, exceeds a predetermined threshold, and in even further examples, the function controller is adapted to disable the switching after having executed the switching to the first rear view as long as the malfunction is present.

In some embodiments, the indication area of the rear view mirror assembly is shaped as a frame arranged at least partly around at least one of the display screen or the reflective mirror element.

In an example, the rearview mirror assembly contains at least one signal unit to send-out warning signals or traffic relevant hints, and in some examples, the signal unit is adapted to indicate at least one of a blind spot warning, temperature, battery status, traffic jam warning, navigation information, multimedia displays, fatigue detection, inspection instructions, weather information, absent calls, incoming calls, calendar appointments, social media information, or autonomous driving instructions.

In some embodiments, a vehicle comprises the rear view mirror assembly, and the rear view mirror assembly is attached to the vehicle at a position providing a view of a rear traffic to a driver.

The above described embodiments might be used separately or in any suitable combination to each other.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein:

FIG. 1 shows schematically an embodiment of the interior rear view mirror assembly in a perspective view for a position with the display screen visible to the driver and the reflective element visible to the driver;

FIG. 2 shows the embodiment of FIG. 1 in a lateral cut;

DETAILED DESCRIPTION

Figure 3:
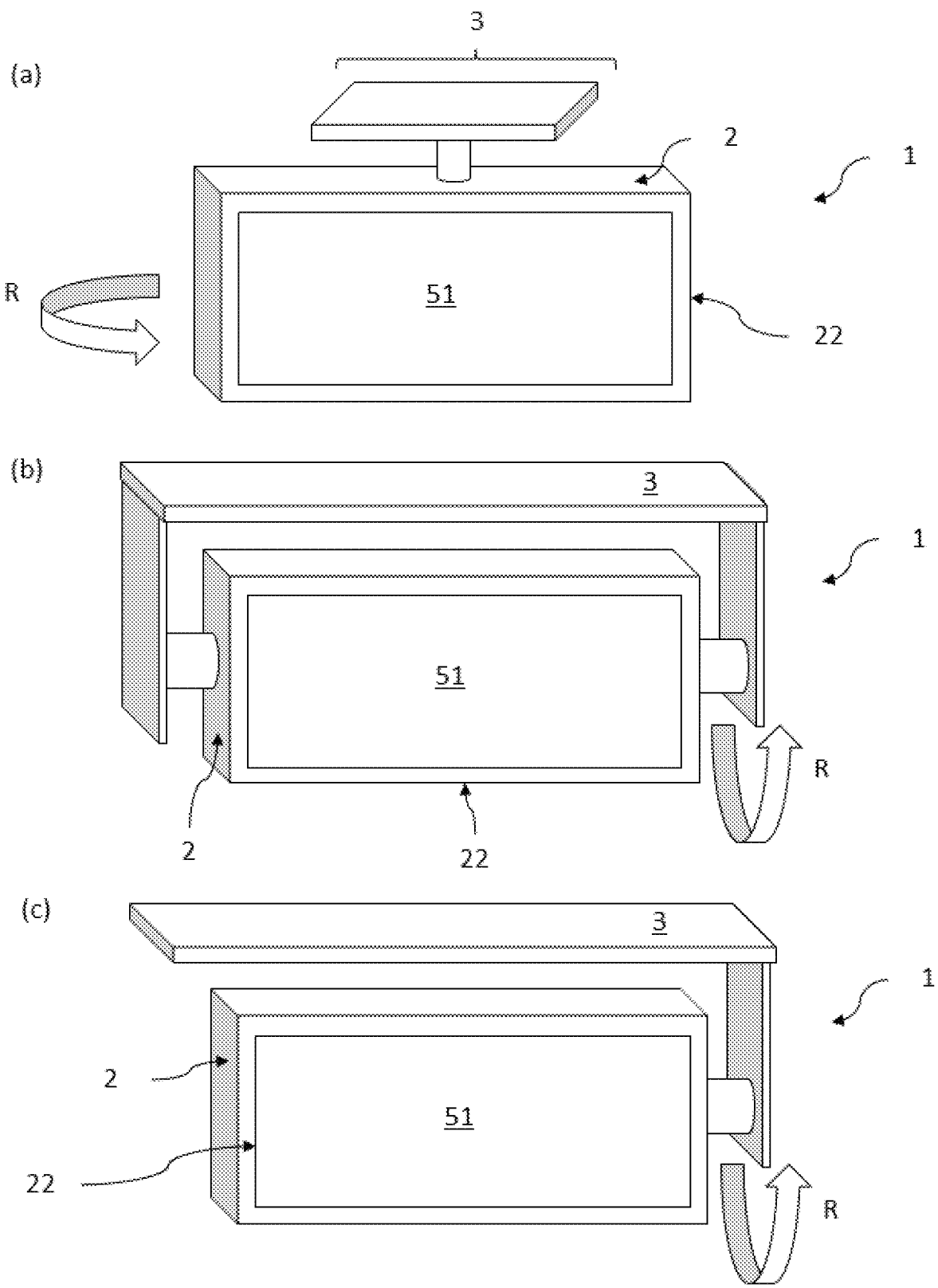
FIG. 3 shows different embodiments of possible suspensions of the mirror housing at the housing holder.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of describing the present disclosure and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the present disclosure or the appended claims. Further, it should be understood that any one of the features can be used separately or in combination with other features. Other systems, methods, features, and advantages of the present disclosure will be or become apparent to those skilled in the art upon examination of the description. It is intended that all such additional systems, methods, features, and advantages be included within this description, be within the scope of the present disclosure, and be protected by the accompanying claims.

FIG. 1 shows schematically an embodiment of the interior rear view mirror assembly in a perspective view for a position with (a) the display screen visible to the driver and (b) the reflective element visible to the driver. The interior rear view mirror assembly 1 comprising a mirror housing 2 rotatable attached to housing holder 3 along a vertical axis. Referring to FIG. 1, in (a), the first rear view side 21 where a reflective mirror element 4 is attached to is visible to the driver. In (b), the second rear view side 22 where a display device 5 with a display screen 51 is attached to is visible. The first and second rear view sides 21, 22 are oppositely arranged to each other in order to provide a view of a rear traffic to the driver D either via the reflective mirror element 4 or via the display screen 51, where a camera 52 is connected to the display device 5 establishing a display system 50 to provide an image of the rear traffic to the display screen 51, see FIG. 4 for more details. Via rotation R along the vertical axis both sides can be exchanged for the driver D either manually or automatically via an actuator 6, see FIG. 2. The mirror housing 2 further comprises an indication area 23 being illuminated by a lighting unit to indicate a manual mode, an actuator driven mode or a blocked mode for rotating the mirror housing 2 via different colors. In an embodiment (not shown here) the indication area 23 might be shaped as a frame arranged at least partly around the display screen 51 and/or the reflective mirror element 4. The interior rear view mirror assembly 1 further comprises at least one signal unit 7 to send-out warning signals or traffic relevant hints to the driver D. Here, signal unit 7 and indication area 23 are combined to a combined area. The signal unit 7 is adapted to indicate at least one of the following elements blind spot warning, temperature, battery status, traffic jam warning, navigation information, multimedia displays, fatigue detection, inspection instructions, weather information, absent calls, incoming calls, calendar appointments, social media information and/or autonomous driving instructions. Furthermore the housing holder 3 is adapted to enable a rotation of the housing holder 3 relative to the interior of the vehicle 10 either manually of automatically via a corresponding holder actuator 31.

FIG. 2 shows the embodiment of FIG. 1 in a lateral cut, where the interior rear view mirror assembly 1 further comprises an actuator unit 6 to automatically rotate the mirror housing 2 along the vertical axis to the first or second rear view side 21, 22 to provide the rear traffic to the driver D. The suspension of the mirror housing 2 to the housing holder 3 here is designed as a swivel joint inside the mirror housing 2. In other embodiments the suspension might be inverted, where the housing holder 2 is fixed to a pin with the swivel joint inside the housing holder 2. The suspension pins (or shafts) shown in FIGS. 1-3 are linearly shaped. In other embodiments the corresponding pins might be differently shaped and may comprise a suitable curvature. The actuator unit 6 is adapted to rotate the mirror housing 2 from the second rear view side 22 to the first rear view side 21 to be visible to the driver in response to an error signal ES in case of detecting a malfunction of the display system 50, preferably in a time range below 1 sec after the malfunction is detected. In order to achieve fast rotation times the actuator unit 6 comprises a shape memory alloy. The actuator unit 6 also comprises a preloaded mechanism in order to perform a rapid rotation of the mirror housing 2 in case of detecting the malfunction, even in case of lacking electrical power. The display device 5 further comprises a function controller 53 (and a display driver not shown here), here arranged in the mirror housing 2, to prove the correct function of the display system 50 either periodically or continuously ensuring that rear traffic is displayed correctly on the display screen 51 and to send-out the error signal ES in case of the detected malfunction. The function controller 53 is adapted to check whether recording of the rear traffic is prevented or hampered by a contamination of the camera exceeding a predetermined threshold and/or whether electrical errors within the display system comprising at least one or more errors of the group of so-called Ghost-Scenarios, flickering, present of a frozen image, image distortion, image pixel failures, provided power is weak or unsecure, exceeds a predetermined threshold. Additionally the function controller 53 disables the rotation of the mirror housing 2 after having executed the rotation to the first side 21 as long as the malfunction is present. Here, the function controller switches off the actuator 6 and blocks its function. Furthermore, the mirror housing 2 further comprises a latching mechanism 24 to latch the selected rear view side 21, 22 in the correct position. The mirror housing 2 or the housing holder 3 may comprise a switch (not shown here) to switch off the actuator 6 or to fix the mirror housing 2 to a certain position. For the operation of the electrical components within the mirror housing 2, there might be a suitable adapted printed circuit board arranged and operated inside the mirror housing 2, which can be cooled via air vent slots in the mirror housing 2.

FIG. 3 shows different embodiments of the suspension of the mirror housing 2 at the housing holder 3. The suspension of the mirror housing 2 to carry out the rotation R can be designed differently and include one or more suspension points for the rotation R. In (a), the rotation is executed around a vertical axis, where the mirror housing 2 is connected to the housing holder 3 by a rotatable pin or shaft at the middle of the top surface of the mirror housing 2. In (b), the mirror housing 2 is connected to the housing holder 3 via two horizontally aligned pins or shafts, where the rotation R is executed around a corresponding horizontal axis. In (c), the horizontal rotation R corresponds to (b), but there is only one suspension pin or shaft at one side of the mirror housing 2. The side faces of the mirror housing 2 may comprise one or more air vent slots to cool the display device 5 in the mirror housing 2.

Figure 4:
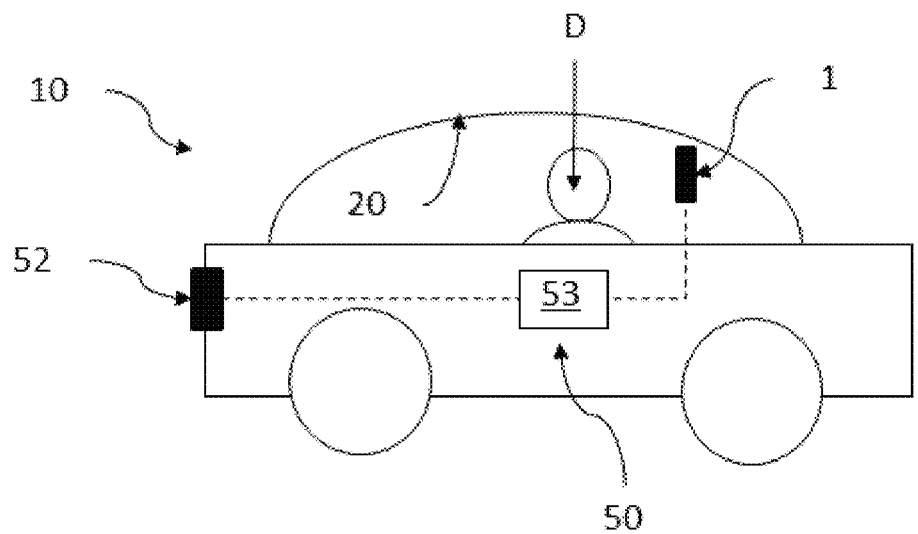
FIG. 4 shows schematically a vehicle according including an interior rear view mirror assembly.

FIG. 4 shows schematically a vehicle 10 including an interior rear view mirror assembly 1, where the interior rear view mirror assembly 1 is attached to an interior 20 of the vehicle 10 at a suitable position to provide a view of a rear traffic to the driver D further comprising a display system 50 comprising a camera 52 arranged at the back side of the vehicle 10. The camera is connected to the display device 5 of the interior rear view mirror assembly 1 via the function controller 53 to provide an image of the rear traffic to the display screen 51 of the display device 5. In this embodiment the function controller 53 is arranged outside the interior rear view mirror assembly 1 enabling use of a function controller without any size limitation based on the dimensions of the interior rear view mirror assembly 1.

Figure 5:
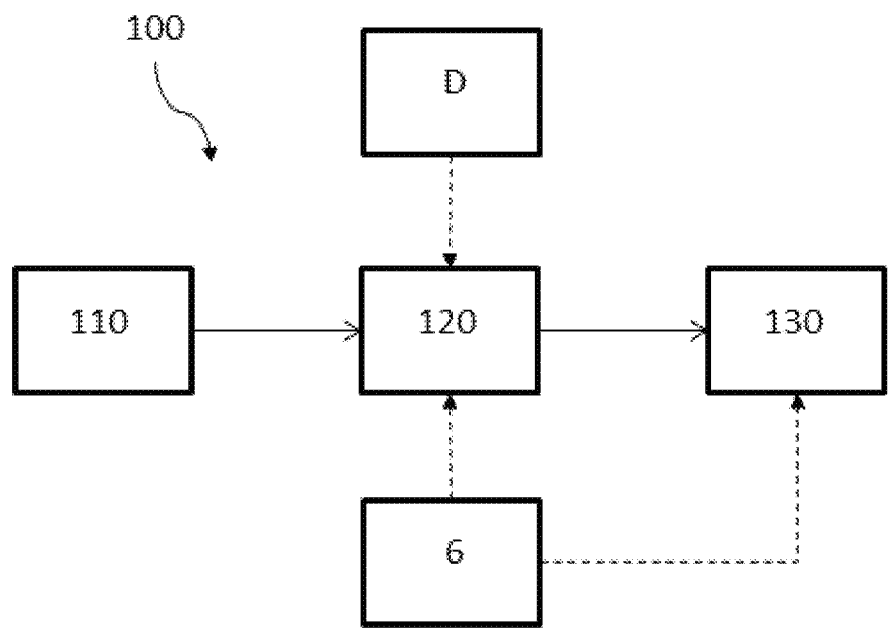
FIG. 5 shows a method to operate an interior rear view mirror assembly.

FIG. 5 shows an embodiment of the method 100 to operate an interior rear view mirror assembly 1, where the interior rear view mirror assembly 1 is attached to an interior 20 of the vehicle 10 at a suitable position to provide a view of a rear traffic to the driver D comprising a mirror housing 2 rotatable attached to housing holder 3 having a first rear view side 21 and a second rear view side 22 being oppositely arranged to the first rear view side 21, comprising the steps of providing 110 a view of a rear traffic to the driver D either via a reflective mirror element 4 attached to the first rear view side 21 or via the display screen 51 of a display device, where the display screen 51 is attached to the second rear view side 22 and where a camera 52 is connected to the display device 5 establishing a display system 50 to provide an image of the rear traffic to the display screen 51; rotating 120 the mirror housing 2 from the first rear view side 21 to the second rear view side 22 or vice versa on demand of the driver D in case of correct function of the display system 5 either manually or via an actuator unit 6 to automatically rotate the mirror housing 2; and rotating 130 the mirror housing 2 by the actuator unit 6 automatically from the second rear view side 22 to the first rear view side 21 to be visible to the driver in response to an error signal ES in case of detecting a malfunction of the display system 50.

Figure 6:
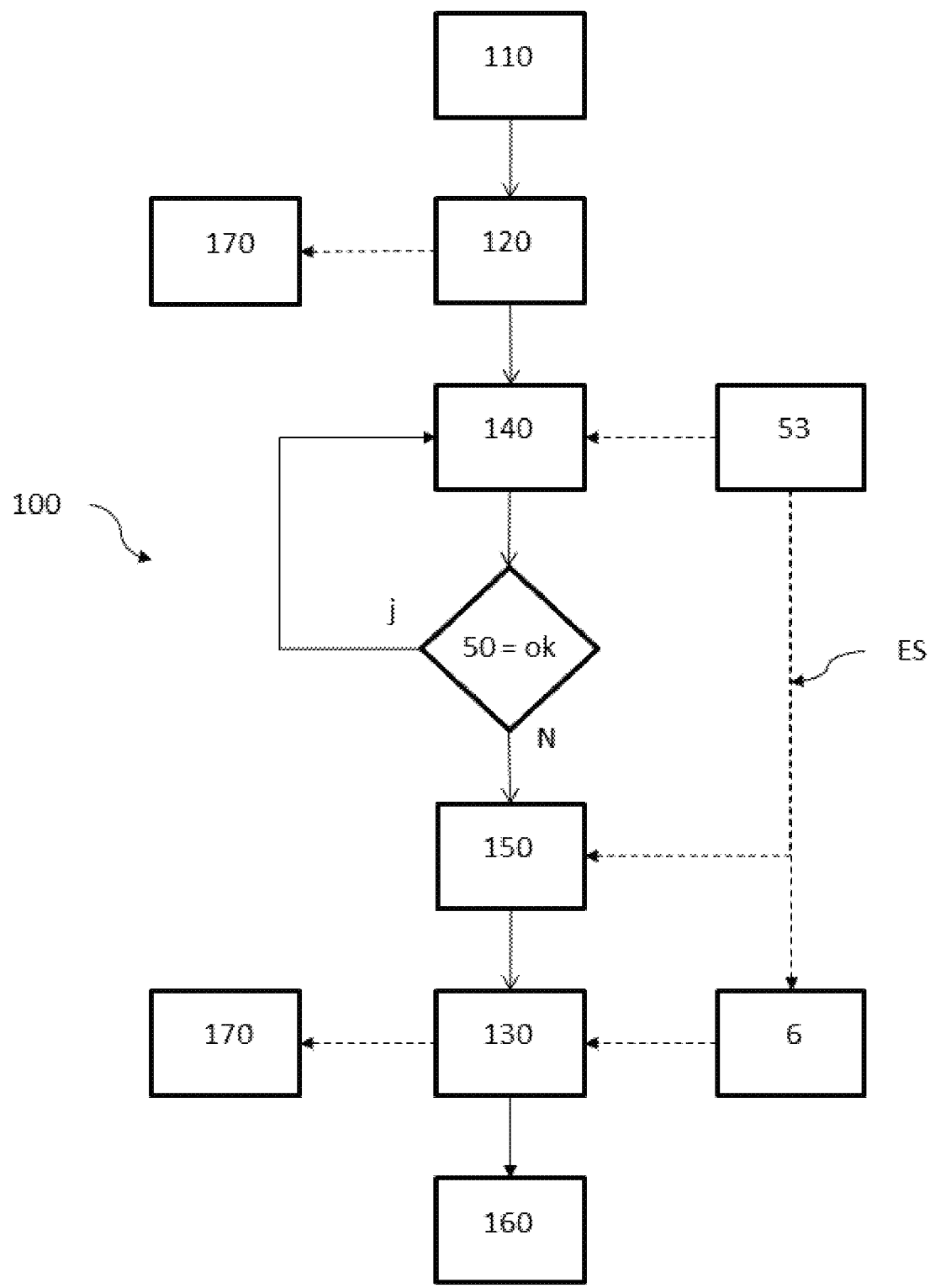
FIG. 6 shows another embodiment of the method to operate an interior rear view mirror assembly.

FIG. 6 shows another embodiment of the method 100 to operate an interior rear view mirror assembly 1, where in addition to the steps shown in FIG. 3 the method includes the further steps of proving 140 a correct function of the display system 50 by a function controller 53 of the display system 50 ensuring that the rear traffic is displayed correctly on the display device 50. In case of determined correct functionality of the display system ("Y"), the system prove continues. In case of determined malfunction of the display system ("N"), the error signal ES is send-out 150 by the function controller 53. Here the rotation step 130 is additionally followed by disabling 160 the rotation of the mirror housing 2 after having executed the rotation to the first rear view side 21 as long as the malfunction is present by the function controller 53. The method may comprise the further step of indicating 170 a manual mode, a actuator driven mode or a blocked mode for rotating the mirror housing 2 via different colors by an indication area 23 of the mirror housing 2 being illuminated by a lighting unit, preferably arranged at least partly around the display screen 51 and/or the reflective mirror element 4. The steps 120 and/or 130 might be followed by step 170.

Figure 7:
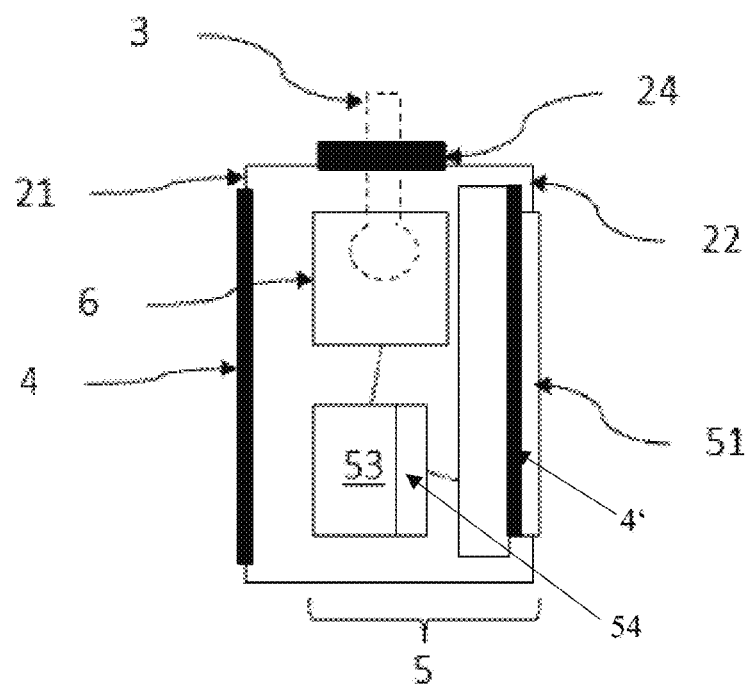
FIG. 7 shows an embodiment of a rear view mirror assembly in a lateral cut

FIG. 7, shows another embodiment of a rear view mirror assembly in a lateral cut, similar to FIG. 2 but with a second reflective mirror element 4' and a switching element 54. The rear view mirror assembly comprises a mirror housing 2 that is attached to the housing holder 3. Housing holder 3 is adapted to be attached to the vehicle 10. The mirror housing 2 further comprises at least one reflective mirror element 4, 4' and display screen 51. At least one camera 52 is comprised of the display system to facilitate providing a picture on the display screen 51. Reflective mirror element 4 is on the first rearview side 21, and reflective mirror element 4' is on the second rearview side 22. Further, the rearview mirror assembly comprises a switching unit 54 that is configured to switch display screen 51 on and off. When display screen 51 is switched off, reflective mirror element 4' takes over the function of providing a rear view to the driver D on the second side 22. The switching unit 54 is able to switch between the first and second rearview sides 21, 22 in order to switch between the display screen 51/reflective mirror element 4' or reflective mirror element 4 being shown to the driver. The switching unit 54 is further adapted to switch from the first rearview side 21 to the second rearview side 22 in response to an error signal of a malfunction of the display system 50 being detected. The display system 50 also includes a function controller 53 that can prove a correct function of the display system 50 to ensure that the rear traffic is displayed correctly on the display screen 51 and the function controller is adapted to send-out the error signal in case of the detected malfunction. Additionally, in embodiments, function controller 53 of the rearview mirror assembly is adapted to disable the switching after having executed the switching to the first rear view 21 side as long as a malfunction or error signal is present. The mirror housing 2 also contains an indication area 23 that is illuminated by a lighting unit. The indication area 23 that is illuminated by the lighting unit indicates different modes, such as a manual mode, a switching unit mode, or a blocked mode for switching from the second rearview 22 to the first rearview 21 via different colors so that the indication area indicates to the driver which mode can be used to switch between the second rearview 22 and the first rearview 21. The reflective mirror element 4' of the rearview assembly may be arranged in front or behind the display screen 51, on the same side as the mirror housing 2. In some embodiments the first and second rearview sides 21, 22 are arranged opposite each other to provide a view of traffic through either reflective mirror element 4 or via the display screen 51/reflective element 4' with one side 21, 22 supporting the reflective mirror element 4 and another side supporting the display screen 51/reflective mirror element 4'. In embodiments, the rearview mirror assembly may comprise an actuator unit 6 that is adopted to automatically rotate the mirror housing from the second rearview side 22 to the first rearview side 21 in response to an error signal of a malfunction in the display system being detected. In embodiments, the indication area 23 illuminated by the lighting unit of the rearview mirror assembly also indicates an actuator driven mode, via a different color from the modes above, so that the indication area 23 tells the driver which mode can be used to switch and/or rotate between the second and the first rearview 22, 21. In embodiments the switching unit 54, or actuator 6 is adapted to switch/rotate from the second rearview 22 to the first rear view 21 in a time range under one second after the malfunction is detected. Notably, this embodiment of the rearview assembly may be an exterior or interior rearview assembly.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The features disclosed in the claims, the specification, and the drawings maybe essential for different embodiments of the claimed invention, both separately or in any combination with each other.

REFERENCE NUMERALS 1 interior rear view mirror assembly
2 mirror housing
21 first rear view side
22 second rear view side
23 indication area, e.g. in shape of a frame around the reflective element and/or the display screen
24 latching mechanism
3 housing holder
31 holder actuator
4 reflective mirror element
4' reflective mirror element
5 display device
51 display screen
52 camera
53 function controller
54 switching unit
6 actuator unit to rotate the mirror housing
7 signal unit
10 vehicle, e.g, a motor vehicle, comprising an interior rear view mirror assembly
20 interior of the vehicle
50 display system
100 method to operate an interior rear view mirror assembly
110 providing a view of a rear traffic to the driver
120 rotating the mirror housing from the first rear view side to the second rear view side or vice versa on demand of the driver
130 rotating the mirror housing automatically from the second rear view side to the first rear view side in case of detecting a malfunction of the display system
140 proving the correct function of the display system (50) by a function controller
150 sending-out the error signal by the function controller
160 disabling the rotation of the mirror housing (2) after having executed the rotation to the first side as long as the malfunction is present
170 indicating a manual mode, a actuator driven mode or a blocked mode for rotating the mirror housing
D driver
ES error signal
R rotating the mirror housing

What is claimed is:

1. A rear view mirror assembly for a vehicle, comprising:
a mirror housing attached to a housing holder which is adapted to be attached to the vehicle, the mirror housing comprising
at least one reflective mirror element; and
at least one display screen of a display system, wherein at least one camera is comprised of the display system to provide an image to the display screen; and
a switching unit configured to automatically switch between a first rear view presented to a driver of the vehicle on the display screen to a second rear view presented to the driver of the vehicle on the reflective mirror element,
wherein the switching unit is adapted to switch from the first to the second rear view to be visible to the driver in response to an error signal of a malfunction of the display system being detected,
wherein the display system further comprises a function controller adapted to prove a correct function of the display system to ensure that rear traffic is displayed correctly on the display screen and to send-out the error signal in case of the detected malfunction,
wherein the mirror housing comprises an indication area illuminated by a lighting unit to indicate a manual mode, a switching unit mode, or a blocked mode for switching from the second rear view to the first rear view via different colors so that the indication area indicates to the driver which mode can be used to switch between the second and first rear views, and wherein the reflective mirror element is disposed behind the display screen, on the same side of the mirror housing, such that when the display screen is switched off the reflective element is visible through the display screen.

2. The rear view mirror assembly of claim 1, wherein the rear view mirror assembly is an exterior rear view assembly.

3. The rear view mirror assembly of claim 2, further comprising a second reflective mirror element arranged on a side of the housing opposite the display screen.

4. The rear view mirror assembly of claim 3, further comprising an actuator unit that is configured to rotate the mirror housing such that either the display screen or the second reflective mirror element is facing a driver.

5. The rear view mirror assembly of claim 4, wherein the actuator automatically rotates the housing in response to an error signal indicating detection of a malfunction in the display system.

6. The rear view mirror assembly of claim 5, wherein the actuator is configured to rotate the mirror housing in a time range under one second after the malfunction is detected.

7. The rear view mirror assembly of claim 4, wherein the indication area also indicates an actuator driven mode, via a different color from a color of the manual mode, switching unit more or blocked mode.

8. The rear view mirror assembly of claim 1, wherein the rear view mirror assembly is an interior rear view assembly.

9. The rear view mirror assembly of claim 8, wherein first and second rear view sides are arranged opposite to each other to provide a view of traffic either via the reflective mirror element or via the display screen, with a first rear view side of the housing supporting the reflective mirror element and a second rear side of the housing supporting the display screen.

10. The rear view assembly of claim 9, further comprising an actuator unit which is adapted to automatically rotate the mirror housing from the second rear view side to the first rear view side in response to an error signal of a malfunction of the display screen being detected.

11. The rear view assembly of claim 10, wherein the indication area illuminated by the lighting unit also indicates an actuator driven mode, via a different color so that the indication area indicates to the driver which mode can be used to switch and/or rotate between the second and first rear view.

12. The rear view assembly of claim 10, wherein the actuator unit is adapted to execute the rotation from the second rear view side to the first rear view side in a time range below one second after the malfunction is detected.

13. The rear view mirror assembly of claim 10, wherein the function controller is adapted to disable the rotation of the mirror housing after having executed the rotation to the first rear view side as long as the malfunction is present.

14. The rear view mirror assembly of claim 8, wherein the mirror housing further comprises a latching mechanism to latch a selected rear view side in a correct position.

15. The interior rear view mirror assembly of claim 8, the housing holder is adapted to enable a rotation of the housing holder relative to the interior of the vehicle either manually or automatically via a corresponding holder actuator.

16. The rear view mirror assembly of claim 1, wherein the switching unit is adapted to execute the switching from the second rear view to the first rear view in a time range below one second after the malfunction is detected.

17. The rear view mirror assembly of claim 1, wherein the function controller is adapted to prove the correct function of the display system periodically or continuously.

18. The rear view mirror assembly of claim 1, wherein the function controller is adapted to check whether recording of rear traffic is prevented or hampered by a contamination of the camera exceeding a predetermined threshold.

19. The rear view mirror assembly of claim 1, wherein the function controller is adapted to check whether electrical errors within the display system comprising at least one or more errors of the group of so-called ghost-scenarios, flickering, presence of a frozen image, image distortion, image pixel failures, provided power is weak or unsecure, exceeds a predetermined threshold.

20. The rear view mirror assembly of claim 1, wherein the function controller is adapted to disable the switching after having executed the switching to the first rear view as long as the malfunction is present.

21. The rear view mirror assembly of claim 1, wherein the indication area is shaped as a frame arranged at least partly around at least one of the display screen or the reflective mirror element.

22. The rear view mirror assembly of claim 1, wherein the rear view mirror assembly further comprises at least one signal unit to send-out warning signals or traffic relevant hints.

23. The rear view mirror assembly of claim 22, wherein the signal unit is adapted to indicate at least one of a blind spot warning, temperature, battery status, traffic jam warning, navigation information, multimedia displays, fatigue detection, inspection instructions, weather information, absent calls, incoming calls, calendar appointments, social media information, or autonomous driving instructions.

24. A vehicle comprising the rear view mirror assembly of claim 1, wherein the rear view mirror assembly is attached to the vehicle at a position providing a view of a rear traffic to a driver.

* * * * *